United States Patent [19]

Bradley

[11] 3,927,281

[45] Dec. 16, 1975

[54] INSTRUMENT FOR MEASURING HARMONIC DISTORTION IN TELEPHONE TRANSMISSION

[76] Inventor: Frank R. Bradley, 9 Dash Place, Bronx, N.Y. 10463

[22] Filed: Dec. 3, 1974

[21] Appl. No.: 529,223

[52] U.S. Cl. ....................... 179/175.3 R; 324/57 DE

[51] Int. Cl.$^2$ ............................................ H04B 3/46

[58] Field of Search ......... 179/175.3 R; 324/57 DE, 324/77 D, 77 R

[56] References Cited

UNITED STATES PATENTS

| | | | |
|---|---|---|---|
| 2,782,366 | 2/1957 | Wall | 324/57 DE |
| 3,418,574 | 12/1968 | Wyckoff | 324/77 D |
| 3,535,454 | 3/1968 | Miller | 324/77 R |
| 3,634,760 | 1/1972 | Murtin | 324/77 R |
| 3,814,868 | 6/1974 | Bradley | 179/175.3 R |

*Primary Examiner*—Douglas W. Olms
*Attorney, Agent, or Firm*—Gottlieb, Rackman, Reisman & Kirsch

[57] ABSTRACT

There is disclosed an instrument for measuring and displaying the harmonic distortion introduced during telephone line transmission. A frequency phase lock circuit is employed to generate disturbance-free in-phase and quadrature signals of a received test tone, the disturbancefree generated tones being different from the transmitted test tone as a result of possible frequency shift along the transmission channel and phase shifts in the terminal equipment at both ends. The frequency of each of the in-phase and quadrature signals is multiplied by the harmonic factor of interest (e.g., two). Each of the frequency-multiplied signals is then multiplied by the received test tone, and the two resultant signals, after low-pass filtering, are applied to the vertical and horizontal deflection plates of an oscilloscope to form a display of the type disclosed in my copending application Serial No. 455,197. The display, in addition to reflecting a measurement of the frequency shift along the channel, also provides separate indications of the degree of harmonic distortion which occurs both ahead of the frequency shift (in the send terminal) and after the frequency shift (in the receive terminal).

23 Claims, 5 Drawing Figures

INSTRUMENT FOR MEASURING HARMONIC DISTORTION IN TELEPHONE TRANSMISSION

This invention relates to instruments for measuring the harmonic distortion introduced in a transmission system, and more particularly to such instruments which can distinguish between the harmonic distortion introduced at the send terminal and that introduced in the receive terminal.

In my U.S. Pat. No. 3,814,868 which issued on June 4, 1974 and is entitled "Telephone Line Characteristic Measuring Instrument", there is disclosed an instrument for measuring the different kinds of distortion which may be introduced as a test tone signal is transmitted along a telephone line. In my copending application Ser. No. 455,197, filed on Mar. 27, 1974 and entitled "Telephone Line Characteristic Measuring Instrument and Display", there is disclosed a technique of applying the instantaneous in-phase and quadrature components of the total disturbance on a received test tone (as derived in accordance with the teaching of the aforesaid patent) to respective deflection plates of an oscilloscope. The resulting display is a function of the disturbances only, and allows visual identification of the source of a disturbance (e.g., amplitude modulation, phase modulation, phase hits, white noise, etc.).

There is another type of distortion, however, which is also of considerable interest, namely, harmonic distortion. If a 1-kHz test tone is transmitted, for example, what may actually be received is not only a signal at this frequency (together with the various disturbances considered in my aforesaid patent and application), but in addition signals at twice the test tone frequency, three times the test tone frequency, etc. It is usually the second harmonic, and sometimes the third harmonic, which is of the most interest; higher harmonics are usually band-limited so that they cannot contribute to errors in transmission. Harmonic distortion can be introduced by either the send terminal or the receive terminal, or both. In testing an overall transmission system, it is desirable to identify separately the harmonic distortion introduced by the send terminal and the harmonic distortion introduced by the receive terminal.

It is a general object of my invention to provide a system for measuring and displaying the harmonic distortion introduced by a transmission system, and more particularly for separately measuring the harmonic distortion introduced by the send terminal and the receive terminal. Toward this end, I employ certain features disclosed in my aforesaid patent and application, and the same are hereby incorporated by reference.

Briefly, in accordance with the principles of my invention, I employ a frequency phase lock circuit, of the type disclosed in my aforesaid patent, for generating both a replica of the received test tone (stripped of all disturbances other than frequency and phase shifts) and a replica of it shifted by 90°. These two signals are frequency-multiplied by the harmonic factor of interest (2, 3, etc.), and the frequency-multiplied signals are then used to extract inphase and quadrature harmonic components in the received signal which are synchronous with the multiplied frequency. The two resulting signals are extended through low-pass filters and then applied to opposite deflection plates of an oscilloscope in accordance with the teaching of my aforesaid application.

The resulting display, in the case where a frequency shift is introduced by the transmission channel, is a slowly rotating spot which traverses a circle whose center is offset from the origin of the display. The rate at which the circle is traversed is equal to the frequency shift introduced by the transmission channel multiplied by $(n-1)$ where $n$ is the order of the harmonic being investigated. The distance between the center of the circle and the origin of the display represents the harmonic distortion (in dB relative to the test tone) introduced by the receive terminal. The radius of the circle represents the harmonic distortion (in dB relative to the test tone) introduced by the send terminal.

In the case of a transmission channel which does not introduce a frequency shift, the resulting display is simply a dot. In this case, depending on the phase shifts introduced in the two terminals, the harmonic distortion introduced by the two respective terminals may cancel each other out in the display. In order to separately identify the extent of the harmonic distortion introduced by each terminal, several different test tone signals may be transmitted. Even though the harmonic distortion contributions of the two terminals may not change as the test tone frequency is varied, the phase shifts introduced do usually change with frequency, particularly the phase shift introduced by the channel. The resulting dot displays for the several test tones are usually on the arc of a circle. From this arc it is a simple matter to determine the center of the circle which contains the arc. Once the center of the circle is determined, the two separate harmonic distortion measurements may be read from the display in the usual way.

Further objects, features and advantages of my invention will become apparent upon consideration of the following detailed description in conjunction with the drawing, in which.

Figure 2:
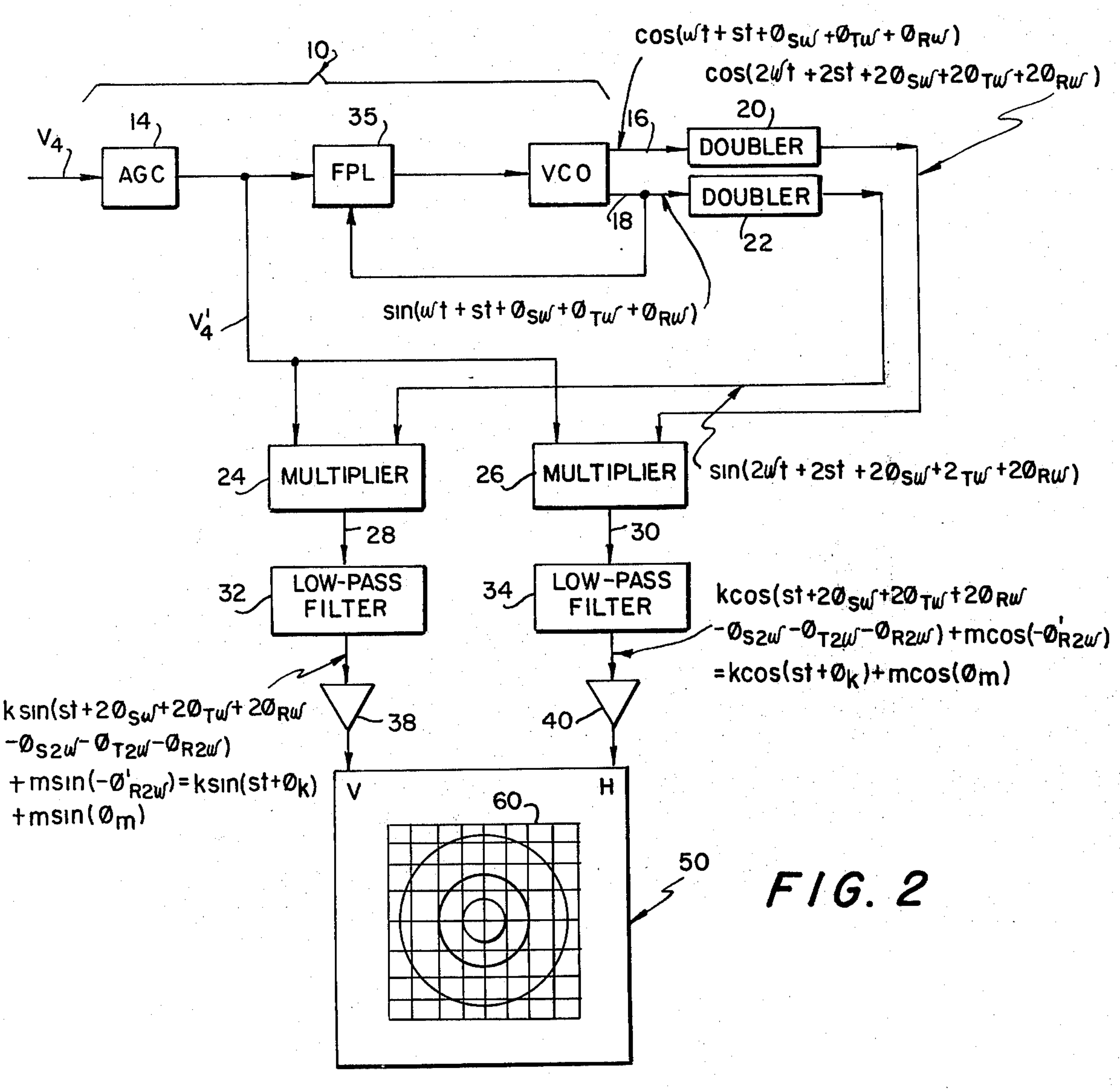
FIG. 2 depicts an illustrative embodiment of the invention.
Figure 3:
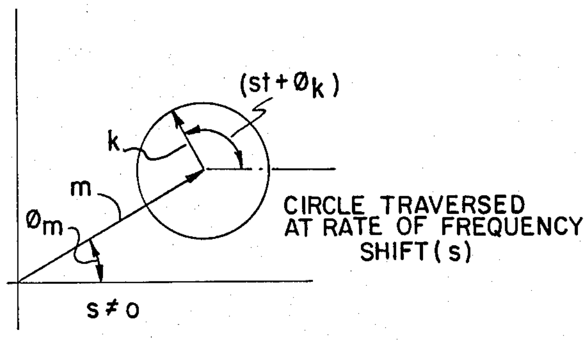
Figure 4:
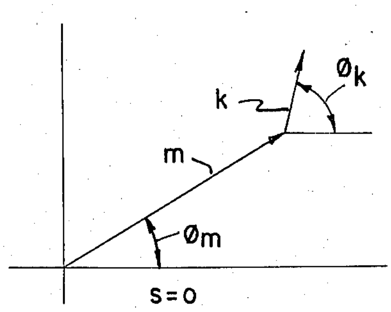
Figure 5:
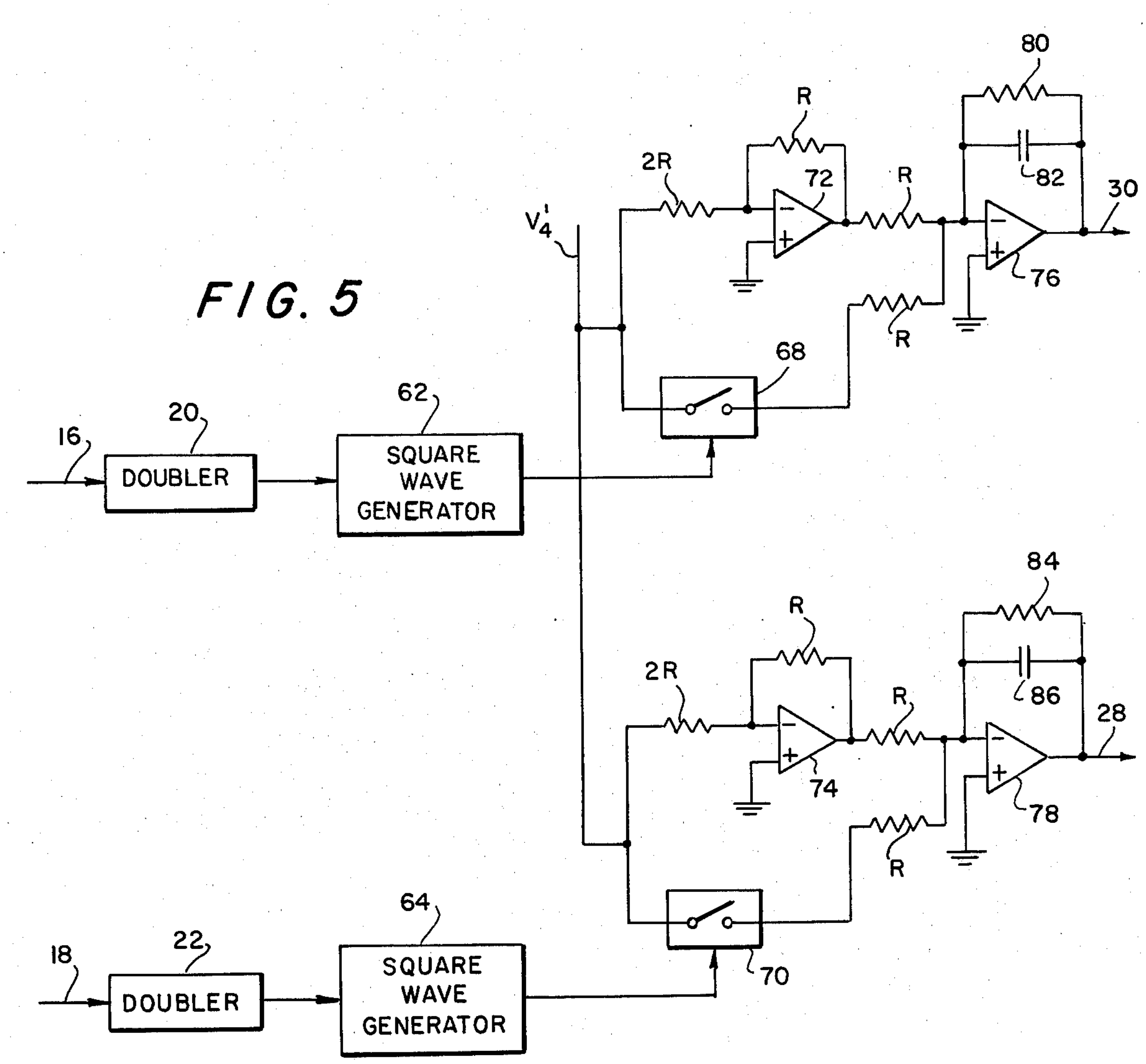

FIGS. 3 and 4 depict the respective types of displays which are formed where there is a frequency shift along the transmission channel and where there is not; and FIG. 5 depicts an alternative circuit for implementing the detection function depicted in FIG. 2 by the numerals 24 and 26.

Figure 1:
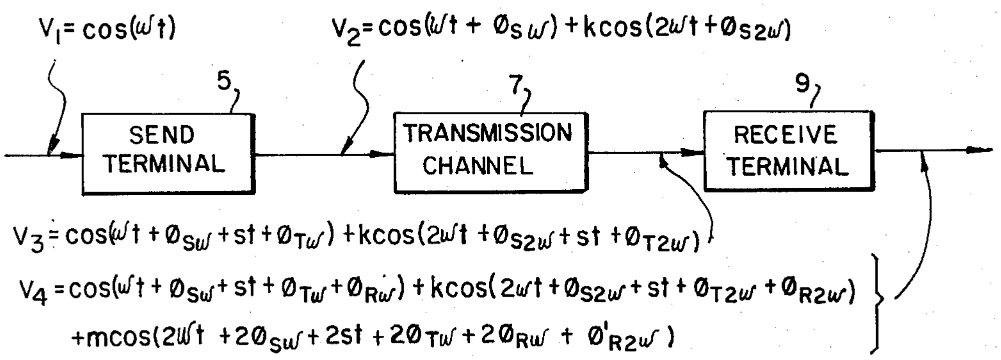
FIG. 1 depicts the general form of a transmission system, together with some of the disturbances which are introduced by the two terminals and the transmission channel.

As shown in FIG. 1, a test tone signal $V_1$ is applied to the input of send terminal 5. The test tone is typically a 1-kHz tone. The output $V_2$ of the send terminal is applied to transmission channel 7, and the output $V_3$ of the transmission channel is applied to the input of receive terminal 9. It is the $V_4$ signal at the output of the receive terminal which is processed for measuring the disturbances on the test tone.

The various equations for the signals $V_2$ through $V_4$ as shown in FIG. 1 reflect only harmonic distortion and phase shift disturbances. There are, of course, numerous other kinds of disturbances, e.g., amplitude modulation, phase modulation, white noise, etc., as generally described in my aforesaid patent. The reason that these other disturbance effects are not reflected in the various equations for the signals $V_2$ through $V_4$ is that they do not affect the signals which appear at the outputs of low-pass filters 32 and 34 in FIG. 2. These filters have a 3-dB roll-off frequency of under 10 Hz, and the disturbance effects which are ignored in the equations of FIG. 1 are those which do not materially affect the signals which are applied to the deflection plates of the oscilloscope. While these disturbances do show up on the display (this is especially true of white noise disturbances), the effects on the display are minor compared to those of the harmonic distortion and phase shift thereof. For this reason, in the following analysis, only these two types of distortions are considered.

The send terminal introduces a phase shift $\phi_{Sw}$ in the test tone, the subscript $w$ being included in the notation inasmuch as the phase shift is a function of the particular test tone frequency. The send terminal also introduces harmonic components. The following analysis considers only the second harmonic. (As will become apparent below, all that is required to measure other harmonics is to multiply the two outputs of the voltage-controlled oscillator 36 by some factor other than 2, e.g., 3, 4, etc.) The output of the send terminal thus includes a component of frequency $2wt$ with an arbitrary phase $\phi_S 2w$ relative to the phase of the test tone. The amplitude of the second harmonic is only a fraction $k$ of the amplitude of the test tone. (Throughout the following analysis, it is assumed that the original tone has an amplitude of unity. The exact amplitude of the test tone is of no importance because of the provision of an automatic gain control circuit 14 in the system of FIG. 2, as will be described below.)

The transmission channel affects the signal $V_2$ in two ways. First, each of the two components in the $V_2$ signal is shifted by the frequency $s$, in those cases where there is a frequency shift. The frequency shift typically arises as a result of frequency division multiplexing of a single sideband channel into a group of channels on a single transmission path. After multiplexing, non-linear distortion is in harmonics relative to the multiplexed frequency rather than to the transmitted tone; such harmonics are outside the individual channel bandwidths and thus are not reflected in the overall signal applied to the receive terminal. The other parameter introduced by the transmission channel which is usually observable in the signal applied to the receive terminal is phase shift. The test tone is shifted in phase by an angle $\phi_{Tw}$ and the second harmonic is shifted in phase by the angle $\phi_{T2w}$, the phase shift being different for the fundamental and the harmonic, and in each case being a function of the particular frequency involved.

The output of the receive terminal has three components — the two components in the $V_3$ signal and an additional harmonic component introduced by the receive terminal itself. The test tone component in the $V_3$ signal is further modified by a phase shift $\phi_{Rw}$ introduced by the receive terminal. The second harmonic component is modified by the introduction of another phase shift $\phi_{R2w}$. The second harmonic component introduced by the receive terminal is a cosine signal whose argument is twice that of the test tone, with an additional phase shift $\phi_{\bar{R}2w}$. The additional phase shift is simply the relative phase of the second harmonic generated by the receive terminal. The amplitude of the second harmonic generated by the receive terminal is only a fraction $m$ of the transmitted tone.

The receive signal is applied to the input of the instrument of FIG. 2. Automatic gain control circuit 14, frequency phase lock circuit 35 and voltage controlled oscillator 36, represented collectively by the numeral 10, serve the purpose of processing the input signal in a manner described in my aforesaid U.S. Pat. No. 3,814,868. The automatic gain control circuit amplifies the incoming signal so that in effect the gain characteristic of the channel does not enter into subsequent measurements. What is important is the relative magnitude of a particular disturbance to the test tone level rather than the absolute magnitudes themselves. The purpose of the automatic gain control is to normalize the test tone, i.e., to amplify it to a fixed reference level, so that the amplitude of any particular disturbance, when measured in absolute terms, is in actuality a measurement relative to the test tone. For the automatic gain control circuit 14 to operate properly, a feedback network must be employed. This network is not shown in FIG. 2, it being understood that automatic gain control circuit 14 is merely symbolic and represents the complete control circuit disclosed in my aforesaid patent.

It is the signal $V_4'$ at the output of the automatic gain control circuit that is used during subsequent processing. The instrument disclosed in my aforesaid patent operates to strip the incoming signal of the received test tone, so that all processing is performed on test signal disturbances alone, rather than on these disturbances together with the test signal. It is possible to do the same thing in accordance with the present invention, that is, to extract just the disturbances from the $V_4'$ signal and to process the disturbances only. However, it is not necessary to do so as will become apparent below.

The $V_4'$ signal is applied to the input of frequency phase lock circuit 35, whose DC output is applied to the control input of voltage controlled oscillator 36. This oscillator generates two signals in quadrature, the one of which on conductor 18 is applied to the second input of the frequency phase lock circuit. The latter circuit develops a DC output which is a measure of the difference between the frequency and phase of the feedback signal and the input signal. The end result of the feedback loop is that the signal on conductor 16 is identical to the test tone signal at the output of the automatic gain control circuit; that is, the signal on conductor 16 is identical not to the original test tone which is transmitted, but rather to that test tone as it is modified in both frequency and phase. The signal on conductor 18 is in quadrature with that on conductor 16. As described in my aforesaid patent, the outputs of the voltage controlled oscillator are disturbance-free pure tones which follow the average phase and frequency of the input test tone. The time constant of the tracking loop which controls the automatic gain control circuit (not shown in FIG. 2) is such that slow changes are followed, while fast changes are not. In other words, the signals on conductors 16 and 18 follow the test tone signal as received (and as modified in frequency and phase), without following higher-frequency (above 20 Hz) amplitude modulation, phase-modulation and noise disturbances.

The two doublers 20 and 22 simply serve to double the respective frequencies of their input signals. It will be noted that each term in the argument of the function represented at the output of a doubler is twice the value of the respective term in the argument of the function represented at the input of the doubler.

The $V_4'$ signal is applied to one input of each of multipliers 24 and 26, and the output of each of the doublers 20 and 22 is applied to the second input of a respective multiplier. The output signals on conductors

28 and 30 contain many, many terms. the $V_4'$ signal contains three terms (it is a normalized $V_4$ signal, as described in my aforesaid patent), and when the $V_4'$ signal is multiplied by the output of one of the doublers, the resulting expanded expression is quite lengthy. Even more important is the fact that in the original expression for the received signal $V_3$ in FIG. 1, many of the disturbance terms have been omitted in the first place. The only terms considered in FIG. 1 are those involving the tone, its harmonics and their phase shifts; amplitude modulation, phase modulation, and similar effects have been ignored.

The justification for ignoring not only several factors in the $V_3$ and $V_4$ signals, but also many of the factors resulting from the multiplication functions, is that they do not appreciably affect the final measurements due to the provision of low-pass filters 32 and 34. These filters are designed to pass only frequencies in the range of normally encountered frequency shifts ($s$ ). In the United States, a typical frequency shift is no more than about 1–2 Hz. Consequently, 3-dB points of 3 Hz for the low-pass filters can be selected. (In other countries, where slightly higher frequency shifts are observed, 3-dp points of 10 Hz may be selected. The resulting displays are not as "clean" because more noise components to get through the filters.) Due to the provision of the low-pass filters, the only terms in the expression for the signal on conductor 28 or conductor 30 which must be considered are those which change at a frequency no higher than about 3 Hz.

The product of two trigonometric signals is a combination of trigonometric signals whose arguments are generally the sums and differences of the arguments of the original signals which are multiplied. When the $V_4'$ signal is multiplied by the signal at the output of doubler 20, the only low-frequency (under 3 Hz) components in the product are those represented at the output of filter 34. In order to simplify the resultant expression, the following two substitutions are made:

$$2\phi_{Sw}+2\phi_{Tw}+2\phi_{Rw}-\phi_{S2w}-\phi_{T2w}-\phi_{R2w}=\phi_k$$
$$-\phi'_{R2w}=\phi_m$$

The resulting signal which is extended to the input of amplifier 40 is thus $k\cos(st+\phi_k)+m\cos(\phi_m)$. This is an all-important signal and the object of the processing. The signal applied to the horizontal deflection plates of oscilloscope 50, after being amplified by amplifier 40, consists of two terms. The first is a slowly changing cosine signal whose frequency is that of the channel frequency shift and whose amplitude is proportional to the send-end harmonic distortion. The second term is a DC quantity which is the product of the receive-end harmonic distortion and the receive terminal phase shift at the harmonic frequency of interest. In a similar manner, the signal at the output of low-pass filter 32 is a combination of two terms: $k\sin(st + \phi_k)$ and $m\sin(\phi_m)$. The individual terms are sine functions rather than cosine functions because the outputs of the voltage controlled oscillator are in quadrature.

As described in my aforesaid application, the graticule of the oscilloscope is marked with circles which represent dB levels relative to the received test tone. The gains of amplifiers 38 and 40 are adjusted so that for a known disturbance, correct readings are obtained from the display.

FIG. 3 illustrates the form of the display when there is a frequency shift along the transmission channel, i.e., S ≠ 0. Suppose for the moment, that k=0 . In such a case, the horizontal deflection voltage is proportional to $m\cos(\phi_m)$ and the vertical deflection voltage is proportional to $m\sin(\phi_m)$. With such signals applied to the deflection plates, a single dot is displayed on the oscilloscope at a distance $m$ from the origin, and at an angle $\phi_m$. This is shown by the vector $m$ in FIG. 3; what is displayed is a dot at the tip of the vector. The gains of amplifiers 38 and 40 are adjusted so that for a given value of receive-end-harmonic distortion (relative to a normalized receive test tone signal), the dot which is displayed is at a point along one of the dB circles which represents the fraction $m$.

Now suppose that $k$ is not 0. In such a case, in addition to the fixed potential $m\cos(\phi_m)$ on the horizontal deflection plates, there is also a time-varying component $k\cos(st+\phi_k)$ ; and in addition to the fixed potential $m\sin(\phi_m)$ on the vertical deflection plates, there is a time-varying component $k\sin(st+\phi_k)$. The two time-varying components, since they have the same amplitude, cause a circle to be traced out on the oscilloscope. The center of the circle is at the tip of the $m$ vector in FIG. 3. For a positive frequency shift $s$, the circle is traced out in the counterclockwise direction and for a negative frequency shift, it is traced out in the clockwise direction. The rate at which the circle is traced out is proportional to the frequency shift $s$. (In general, as mentioned above, the rate at which the circle is traversed is equal to $(n\text{-}1)\ s$, where $n$ is the order of the harmonic being investigated. But in all cases, the rate at which the circle is traced out on the display is proportional to, and represents, the frequency translation s.) And the radius of the circle represented by vector $k$ in FIG. 3 is a direct indication of the send-end harmonic distortion. (The arbitrary phase angle $\phi_k$ is of no importance because what is seen on the oscilloscope is a circle, and the important measurements are the distance between the center of the circle and the origin ($m$), the radius of the circle ($k$), and the rate at which the circle is traced out ($s$) .)

FIG. 4 depicts the form of the display when there is no frequency shift along the channel. Here, each deflection signal is fixed and the resulting display is simply a dot whose position is determined by the vector sum of two vectors.

But if there is no frequency shift along the transmission channel, there is a problem in interpreting the display. It must be recalled that what is seen on the oscilloscope is not two vectors, but rather a single point (at the tip of the $k$ vector). There is no way of telling from this single point what the relative $m$ and $k$ contributions are. More important, if the various phase angles are such that the $m$ and $k$ vectors are actually opposed, the resulting dot on the display may be very close to the origin, while in fact there may be a great deal of harmonic distortion at each end of the channel. It is for this reason that in measuring harmonic distortion, transmission channel frequency shift is desirable. It is the frequency shift which allows a circle to be traced out on the display. This, in turn, permits two distinct measurements —the distance from the origin to the center of the circle, and the radius of the circle.

However, even if there is no frequency shift along the channel, it is still possible to measure the values of $m$ and $k$. Since the angle $\phi_k$ is a function of various phase shifts, and since these phase shifts are in turn a function of the test tone frequency, the angle $\phi_k$ can be varied by changing the frequency of the test tone. Were it possible to vary the angle $\phi_k$ through 360 degrees by continuously changing the test tone frequency, a circle could be formed on the display from which the values

*m* and *k* could be measured. But in actual practice it may not be possible to control a complete circular sweep by the *k* vector since the phase angle $\phi_k$ may not vary over a great range. (It is also necessary to limit test tone frequency variations so that the highest harmonic being examined is well within the channel bandwidth.) In the usual case, as the frequency of the test tone is varied to include at least three values, an arc or three distinct points are presented on the display. By extending this arc, or by completing the circle defined by at least three distinct points, the separate values of *m* and *k* can be estimated. This method is effective because the largest time delay, i.e., phase shift, is normally in the transmission path rather than in the terminals, and is therefore more frequency dependent.

The maximum harmonic distortion, of course, results when the angles $\phi_k$ and $\phi_m$ are equal. The maximum distortion can be determined simply by varying the frequency of the test tone until the resulting dot on the display is at a maximum distance from the origin. This corresponds to adding on a peak basis the send-end and receive-end harmonic distortions. Similar techniques can be employed for adding the two contributions of the distortion sources on an rms basis.

In the above description it is assumed that it is the second harmonic which is of interest. Frequency doublers 20 and 22 are used to generate "noiseless" second harmonic quadrature signals (having their phase shifts related to the received tone). The two generated signals are used to extract second harmonic information from the composite received signal, in "dc" form (or more accurately, in a form in which frequencies only below a few Hz play any role). If it is the third harmonic which is of interest, the only change necessary is the substitution of triplers for the doublers, and similar remarks apply to any other harmonic. The doublers, triplers, etc. serve only to generate reference signals which are at the desired multiple of the received test tone. The reference signals are then used for extracting the harmonic components of interest from the received test signal.

In the system of FIG. 2, linear multipliers 24 and 26 are utilized. Conventional off-the-shelf analog components can be used for the purpose. Rather than to use such components, however, the multipliers depicted in FIG. 5 can be employed. The primary advantage of the circuit of FIG. 5 is that it is relatively inexpensive.

Operational amplifier 72 is provided with a feedback resistance which is half the value of the resistor connected to its minus input. Thus the gain of the stage is $-\frac{1}{2}$. The output of the amplifier is coupled to one input of the summing network (two resistors each of magnitude R) connected to the minus input of operational amplifier 76. The other input of the summing network is connected through switch 68 to the input signal $V_4'$. When the gate is closed, the gain of the lower branch which includes the gate is +1 as a result of the direct connection of the input signal to the lower summing resistor. When the gate is open, the gain through the lower branch is zero. Consequently, the overall gain from the input $V_4'$ to the minus input of the operational amplifier 76 is $-\frac{1}{2}$ when gate 68 is open, and $+\frac{1}{2}$ when the gate is closed.

The received test tone on conductor 16 has its frequency doubled by element 20, whose output is coupled to the input of square wave generator 62. The square wave generator simply generates an on/off signal for controlling gate 68. The gate thus opens and closes to sample the received signal at twice the rate of the received test tone.

The net effect of multiplying the input $V_4'$ by alternating gains of $+\frac{1}{2}$ and $-\frac{1}{2}$ is that all signal components which are synchronous with twice the received test tone frequency result in an average value at the minus input of amplifier 76 which is non-zero. On the other hand, all frequency components other than that at twice the received test tone frequency (and other even harmonics which are generally negligible) average out to zero. Operational amplifier 76 with its feedback resistor 80 and feedback capacitor 82 functions as an integrater to average out what is in effect a rectified second harmonic input signal. The integrator functions as a low-pass filter (element 34 in FIG. 2) with a 3-db point of approximatley 3 Hz. Consequently, the resulting signal on conductor 30 is as shown in FIG. 2.

Similar remarks apply to square wave generator 64, gate 70, operational amplifiers 74 and 78, feedback elements 84 and 86, and the other components in the lower half of the circuit of FIG. 5. The only difference is that the input conductors 16 and 18 are out of phase by 90°. The resulting signal on conductor 28 is that shown in FIG. 2.

As described above, the $V_4'$ signal can be the output of the automatic gain control circuit 14, or it can be this signal after the test tone is removed from it, as described in my aforesaid patent. It makes no difference whether the test tone is in the composite signal because the frequency at which gates 68 and 70 are operated is so much greater than the test tone frequency that the resulting (multiplication) signal components at the inputs of operational amplifiers 76 and 78 are so high in frequency that they are not reflected in the outputs on conductors 28 and 30 by virtue of the time constants of the integrators (which function as low-pass filters). In the circuit of FIG. 5, all components in the $V_4'$ signal are essentially multiplied by a signal at twice the frequency of the received test tone. One of the disadvantages of the circuit of FIG. 5 is that the higher order harmonics of the square waves do affect the outputs on conductors 28 and 30. This is usually not an important effect, but where it is linear multipliers such as those shown in FIG. 2 can be employed. The gains of the multipliers in FIG. 2 and FIG. 5 are necessarily different since in FIG. 2 the second harmonic is being multiplied by a sine wave in each multiplier rather than by a square wave. But this simply requires a different gain setting for each of amplifiers 38 and 40. The amplifiers are initially set to form proper displays for second harmonics of known amplitude relative to a test tone. The two amplifiers are also provided with polarity controls so that their gains can be inverted if necessary to form the display in the proper quadrant for a known test signal and harmonics.

Although the invention has been described with reference to particular embodiments, it is to be understood that these embodiments are merely illustrative of the application of the principles of the invention. For example, rather than to form a display, the signals at the outputs of amplifiers 38 and 40 can be processed to provide digital readings of *m* and *k*, and even *s*. Thus it is to be understood that numerous modifications may be made in the illustrative embodiments of the invention and other arrangements may be devised without departing from the spirit and scope of the invention.

What I Claim Is:

1. An instrument for displaying harmonic distortion in a transmission system by operating on a received signal having test tone and disturbance components therein comprising means for deriving from the received signal a signal which is representative of the frequency of the received test tone, means for generating from the derived signal a pair of quadrature signals whose frequency is that of the derived signal multiplied by a harmonic factor of interest, a pair of means each for multiplying by a respective one of said quadrature signals at least that part of the received signal which contains therein the harmonic of interest for generating a pair of display signals, each of said multiplying means including low-pass filter means for limiting the highest frequencies in said display signals to approximately the maximum frequency shift exhibited during normal signal transmission, display means having first and second orthogonal input circuits responsive to the application of signals thereto for generating a display, and means for coupling each of said display signals to a respective one of said orthogonal input circuits.

2. An instrument in accordance with claim 1 wherein said display means generates the display of a circle for which: (a) the radius of the circle represents the level of harmonic distortion introduced at the transmitting end of a transmission channel, and (b) the distance between the center of the circle and the origin of the display represents the level of harmonic distortion introduced at the receiving end of the transmission channel.

3. An instrument in accordance with claim 2 wherein said display means controls the displayed circle to be traversed at a rate which represents the frequency shift introduced by said transmission channel.

4. An instrument in accordance with claim 2 further including means for normalizing said received signal so that the distances on said display which represent harmonic distortions represent such harmonic distortions as fractions of the test tone in said received signal.

5. An instrument in accordance with claim 4 wherein said multiplying means are analog multipliers.

6. An instrument in accordance with claim 4 wherein said generating means include means for generating from said derived signal a pair of square waves, and said multiplying means includes a pair of means each for sampling at least that part of the received signal which contains therein the harmonic of interest under control of a respective one of the square waves.

7. An instrument in accordance with claim 2 wherein said multiplying means are analog multipliers.

8. An instrument in accordance with claim 2 wherein said generating means include means for generating from said derived signal a pair of square waves, and said multiplying means includes a pair of means each for sampling the harmonic of interest under control of a respective one of the square waves.

9. An instrument in accordance with claim 1 further including means for normalizing said received signal so that said display represents harmonic distortions as fractions of the test tone in said received signal.

10. An instrument in accordance with claim 1 wherein said multiplying means are analog multipliers.

11. An instrument in accordance with claim 1 wherein said generating means include means for generating from said derived signal a pair of square waves, and said multiplying means includes a pair of means each for sampling at least that part of the received signal which contains therein the harmonic of interest under control of a respective one of the square waves.

12. An instrument for displaying harmonic distortion in a transmission system by operating on a received signal having test tone and disturbance components therein comprising means for deriving from the received signal a pair of single-frequency quadrature signals whose frequency is that of the test tone multiplied by a harmonic factor of interest, a pair of means each responsive to a respective one of said quadrature signals to extract harmonic information of interest contained in the received signal and for generating a pair of display signals, display means having first and second orthogonal input circuits responsive to the application of signals thereto for generating a display, and a pair of low-pass filter means for coupling a respective one of said display signals to a respective one of said orthogonal input circuits.

13. An instrument in accordance with claim 12 wherein said display means generates the display of a circle for which: (a) the radius of the circle represents the level of harmonic distortion introduced at the transmitting end of a transmission channel, and (b) the distance between the center of the circle and the origin of the display represents the level of harmonic distortion introduced at the receiving end of the transmission channel.

14. An instrument in accordance with claim 13 wherein said display means controls the displayed circle to be traversed at a rate which represents the frequency shift introduced by said transmission channel.

15. An instrument in accordance with claim 13 further including means for normalizing said received signal so that the distances on said display which represent harmonic distortions represent such harmonic distortions as fractions of the test tone in said received signal.

16. An instrument in accordance with claim 13 wherein said pair of means are analog multipliers.

17. An instrument in accordance with claim 13 wherein said deriving means include means for generating from said received signal a pair of square waves, and said pair of means includes a pair of means each for sampling at least that part of the received signal which contains therein the harmonic of interest under control of a respective one of the square waves.

18. An instrument in accordance with claim 12 further including means for normalizing said received signal so that said display represents harmonic distortions as fractions of the test tone in said received signal.

19. An instrument in accordance with claim 12 wherein said pair of means are analog multipliers.

20. An instrument in accordance with claim 12 wherein said deriving means include means for generating from said received signal a pair of square waves, and said pair of means includes a pair of means each for sampling at least that part of the received signal which contains therein the harmonic of interest under control of a respective one of the square waves.

21. An instrument for determining harmonic distortion in a transmission system by operating on a received signal having test tone and disturbance components therein comprising means for deriving from the received signal a pair of quadrature signals whose frequency is that of the test tone multiplied by a harmonic factor of interest, a pair of means each responsive to a respective one of said quadrature signals to extract harmonic information of interest contained in the received signal and for generating a pair of output signals, each of said pair of means including low-pass filter means for limiting the highest frequencies in said output signals to approximately the maximum frequency shift exhibited during normal signal transmission, and means for processing said pair of output signals to represent the harmonic distortion in said received signal.

22. An instrument in accordance with claim 21 wherein said pair of means are analog multipliers.

23. An instrument in accordance with claim 21 wherein said deriving means include means for generating from said received signal a pair of square waves, and said pair of means includes a pair of means each for sampling at least that part of the received signal which contains therein the harmonic of interest under control of a respective one of the square waves.

* * * * *